United States Patent [19]
Labat et al.

[11] Patent Number: 5,909,466
[45] Date of Patent: Jun. 1, 1999

[54] ADAPTIVE EQUALIZER FOR DIGITAL COMMUNICATIONS SYSTEMS

[75] Inventors: Joël Labat, Plougastel; Christophe Laot, Plougonvelin; Odile Macchi, Orsay, all of France

[73] Assignee: France Telecom, Paris, France

[21] Appl. No.: 08/793,539

[22] PCT Filed: Sep. 13, 1996

[86] PCT No.: PCT/FR96/01417

§ 371 Date: Feb. 7, 1997

§ 102(e) Date: Feb. 7, 1997

[87] PCT Pub. No.: WO97/10664

PCT Pub. Date: Mar. 20, 1997

[30] Foreign Application Priority Data

Sep. 15, 1995 [FR] France .................................. 95/10832

[51] Int. Cl.[6] .................................................. H03H 7/30
[52] U.S. Cl. ........................ 375/233; 375/234; 375/348; 375/349; 364/724.2
[58] Field of Search .................................. 375/229, 230, 375/232, 234, 346, 348, 350; 364/724.011, 724.16, 724.17, 724.19, 724.2

[56] References Cited

U.S. PATENT DOCUMENTS

| 5,285,480 | 2/1994 | Chennakeshu et al. | 375/348 |
| 5,546,430 | 8/1996 | Liao et al. | 375/341 |

FOREIGN PATENT DOCUMENTS

| A-0 512 712 | 4/1992 | European Pat. Off. | H04L 03/25 |
| A-2 260 068 | 9/1992 | United Kingdom | H04L 25/03 |

OTHER PUBLICATIONS

IEEE Transactions on Communications, vol. 35, No. 9, Sep. 1987, New York, pp. 877–887.
IEEE Transactions on Signal Processing, vol. 39, No. 2, Feb. 1991, New York, pp. 522–536.
International Conference on Acoustics, Speech, Signal Processing, Apr. 19–22, 1994, New York, pp. 481–484.
Global Telecommunication Conference, Nov. 29, 1993–Dec. 2, 1993, New York, pp. 87–91.
International Conference on Communications, May 23–26, 1993, New York pp. 1144–1148.

*Primary Examiner*—Amanda Le
*Attorney, Agent, or Firm*—Blakely Sokoloff Taylor & Zafman

[57] ABSTRACT

The equalizer circuit for the receiver of a digital communications system is characterized in that its predictor (11) is purely recursive, its phase equalizer (12) is purely transversal, and the relative positions of those two elements are interchangeable, means for evaluating performance in terms of decision error and for causing the two elements to be interchanged in application of a criterion for evaluating the difficulty of reception, the predictor being upstream and optimized in adaptive and self-learning manner to whiten its own output while the phase equalizer (12) is downstream and optimized in adaptive manner during periods of difficult reception, whereas the predictor (11) is downstream and the phase equalizer (12) is upstream, both being optimized jointly in adaptive manner to minimize decision error between the output ($\hat{d}(n)$) of the decision circuit (2) and its input (w(n) or y(n)) during periods of easy reception. The predictor (11) is then preferably fed with estimated data, so that the circuit thus becomes recursive and non-linear (DFE).

42 Claims, 6 Drawing Sheets

ZEROS OF F(z) '+'
AND POLES OF 1/(1+C(z)) 'o'

INPUT CONSTELLATION

FIG. 8b

OUTPUT CONSTELLATION

ADAPTIVE EQUALIZER FOR DIGITAL COMMUNICATIONS SYSTEMS

The present invention relates to an equalizer circuit (or "equalizer") for receivers in digital communications systems.

In present digital communications systems, receivers include a certain number of functions including demodulation, i.e. transposing the received signal to baseband, equalization, synchronization (bit rate and carrier), decision-making, and channel decoding.

Equalization consists essentially in removing as much intersymbol interference (ISI) as possible, which interference is associated with the fact that the overall transmission system does not satisfy the so-called "Nyquist criterion". This can result from poor strategy in transmission and reception filtering, from poor setting of sampling instants, which is merely a special case, or from a phenomenon of multi-path propagation.

It is recalled that a digital communications system can be considered as comprising a source that transmits, at a rate 1/T and via a channel having a given discrete impulse response, symbols having values taken from a generally complex alphabet of finite size. This transmission rate constitutes the modulation speed and is generally expressed in Baud, T representing the time interval defined by transmitting two successive symbols (symbol time).

Historically, the first circuits used for countering the phenomenon of intersymbol interference were described by Lucky in the following publication:

[1] R. W. Lucky, "Automatic equalization for digital communications", BSTJ 44, pp. 547–588, April 1965.

Essentially he described adaptive linear transversal filters that are "synchronous" (i.e. using only one sample per symbol time), with adaptation being made necessary by the varying nature of the transmission channel. The coefficients of the transversal filter were updated using an ISI zero-forcing criterion, with that procedure leading to the folded spectrum being equalized, hence the term "equalizer".

Figure 1:
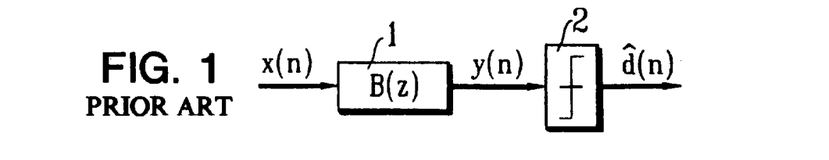
FIG. 1 is a block diagram of a transversal linear equalizer.

That kind of transversal equalizer is shown in FIG. 1 in which there can be seen a front filter 1 of transfer function B(z) together with a decision circuit 2 situated downstream from the front filter.

It was only later that adaptive equalizers appeared that use, as their optimization criterion, minimizing mean square error (MSE). It turned out that with noisy channels, ISI zero forcing could give rise to a significant increase in noise at the output from the equalizer, thus contributing to a large decrease in performance, whereas, in contrast, the criterion of minimizing MSE turned out to be a good compromise enabling a substantial reduction in ISI to be obtained without significant increase in noise.

Equalization was conventionally done in two modes. During the first mode, the circuit was directed by a learning sequence of sufficient length to guarantee convergence, and then in the second mode it became self-adaptive, i.e. it was directed by its own decisions.

Figure 2:
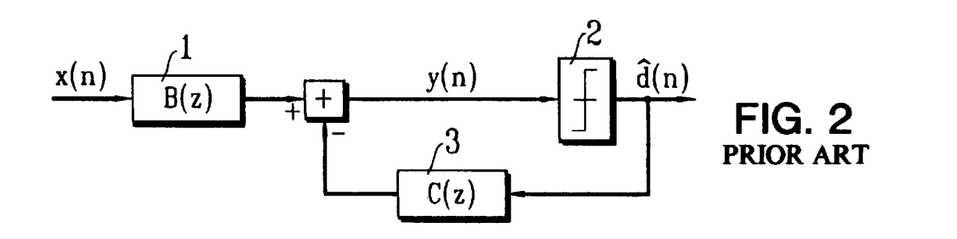
FIG. 2 is a block diagram of an equalizer with decision feedback.

Later still, proposals were made, in particular in the following publication:

[2] C. A. Belfiore, J. H. Park, "Decision feedback equalization", Proceedings of the IEEE 67 (8), August 1979, for non-linear recursive equalizers with decision feedback (decision feedback equalizers or DFEs) in which detected data was fed back into a feedback filter 3 constituting the recursive portion of the equalizer, as shown in FIG. 2.

Under the best circumstances, that approach made it possible to eliminate or at least considerably reduce ISI of causal origin, providing of course there was no decision error. That new structure was expected to give advantageous performance with particularly difficult channels. Unfortunately, those circuits could simultaneously be extremely sensitive to decision errors, such that under severe conditions an error propagation phenomenon could be observed that sometimes went so far as to cause the circuit to diverge. In such situations, it was almost inevitable that the circuit needed to be reinitialized, which meant that a new learning sequence was required and it became essential for the learning sequence to be sent periodically. For any given application, this required, at best, a non-negligible increase in line transmission rate.

From another point of view, although it is true that a decision feedback equalizer (DFE) is not optimum with respect to minimizing error probability (equivalent to the criterion of maximizing likelihood a posteriori), it is nevertheless true that the optimum receiver initially described in:

[3] G. D. Forney, Jr., "Maximum likelihood sequence estimation of digital sequences in the presence of intersymbol interference", IEEE Trans. Inform. Theory, Vol. IT-18, pp. 363–378, May 1972, rapidly becomes impossible to implement when the length of the impulse response turns out to be long. Such a receiver begins by estimating the discrete impulse response of the transmission channel and then performs a search among all possible sequences for the sequence which is closest to the "vector" observation available at the output from the demodulator. At present, implementation of such receivers requires the use of the Viterbi algorithm, as described in:

[4] G. D. Forney, Jr., "The Viterbi algorithm", Proc. IEEE, Vol. 61, pp. 268–278, March 1973, which has the major advantage of making it possible to perform decision-making "on-line" while remaining optimum. In other words it is not necessary to have received all of the message before beginning to take decisions on the most likely sequence of transmitted symbols. Nevertheless, and by way of example, for 2-state phase shift keying (2-PSK) and for the case of a discrete impulse response of length 10, the trellis associated with such a system has 1,024 states, whereas with 4-PSK it has 1,048,576, which, ipso facto, causes that type of receiver to be completely impracticable, at least for "real time" applications. The difficulty increases even more with an increase in the size of the alphabet of transmitted signals. Consequently, that technique can be envisaged in practice only for short ISI lengths, unless the discrete impulse response length of the transmission channel is arbitrarily truncated, which in any case would give rise to a loss of optimality.

Such an ISI length (ten symbol times) is quite conventional in various applications, and in particular for channels used with mobile radios, tropospheric radio, ionospheric radio, or indeed submarine acoustic channels and even on telephone lines. Other things being equal, it is always desirable to convey the highest possible data rates over channels of those types, and that inevitably leads to an increase in the size of the discrete impulse response. Thus, to illustrate the concept, a submarine acoustic channel may have a discrete impulse response of several tens of symbol times T. Consequently, non-linear decision feedback equalizers (DFE), even though suboptimal, nevertheless present a clear major advantage even though they are often difficult to use because of the error propagation phenomenon.

From the description above, it can be seen that there are essentially two equalizing structures, one is linear and transversal while the other is non-linear, recursive, and has decision feedback (DFE), the second structure providing a non-negligible improvement on certain types of channel and also imparting a substantial reduction in noise at the output from the equalizer. Nevertheless, the necessary presence of a learning sequence gives rise to a non-negligible increase in the data rate required and thus in the associated spectrum occupancy. That is the reason behind present work seeking to perform self-learning (blind) equalization. The objective is to enable the channel to be equalized without the help of a learning sequence, i.e. solely on the basis of knowledge about the statistical distribution of input data, which knowledge is, in fact, quite legitimate.

In this respect, several authors have provided non-negligible contributions, including the following:

[5] Y. Sato, "A method of self-recovering equalization for multilevel amplitude modulation", IEEE Trans. Com., COM-23, pp. 679–682, June 1975;

[6] D. N. Godard, "Self-recovering equalization and carrier tracking in two-dimensional data communication systems", IEEE Trans. Com., COM-28, pp. 1867–1875, November 1980;

[7] A. Benveniste, M. Goursat, "Blind equalizers", IEEE Trans. on Com., Vol. 32, 1984, pp. 871–883;

[8] G. Picchi, G. Pratti, "Blind equalization and carrier recovery using a 'stop-and-go' decision-directed algorithm", IEEE Trans. Com., COM-35, pp. 877–887, November 1987;

[9] O. Macchi, Yi Gu, "Self-adaptive equalization with a mixed backward and forward predictor", ISELDECS, Kharagpur, India, pp. 437–440, December 1987;

[10] O. Shalvi, E. Weinstein, "New criteria for blind deconvolution of non-minimum phase systems channels", IEEE Trans. Inform. Theory, Vol. IT-36, No. 2, pp. 312–321, March 1990;

[11] B. Porat, B. Friedlander, "Blind equalization of digital communication channels using high-order moments", IEEE Trans. on Signal Processing, Vol. 39, pp. 522–526, February 1991;

[12] K. Hilal, P. Duhamel, "A blind equalizer allowing soft transition between the constant modulus algorithm and the decision directed algorithm for PSK modulated signals", Internat. Conf. on Comm., Geneva, Switzerland, pp. 1144–1148, May 1993.

All of the above algorithms make implicit reference to statistics of order greater than two since a non-minimum phase channel requires the use of such moments for inversion (deconvolution).

The first equalizers of that type generally made use of linear transversal structures. Nevertheless, other authors investigated linear recursive structures, in particular O. Macchi et al. in the following publications:

[13] C. A. Faria Da Rocha, O. Macchi, "A novel self-learning adaptive recursive equalizer with unique optimum for QAM", ICASSP, Adelaide 94;

[14] C. A. Faria Da Rocha, O. Macchi, J. M. T. Romano, "An adaptive non-linear IIR filter for self-learning equalization", ITS 94, Rio de Janeiro, The equalizer was then essentially constituted by a transversal linear front filter (backward predictor), a purely recursive feedback filter (forward predictor), and automatic gain control (AGC). There remained the need to determine optimality criteria which, when minimized, would lead to a solution as close as possible to the solution that is optimum in the Wiener sense.

The same authors proposed an original cost function [13], comprising a linear combination of a whitening criterion (completely blind) and of a square error minimizing criterion (estimated relative to the decision taken). The main idea was to start with a blind criterion and to move progressively towards a square error minimizing criterion, with the equalizer thus becoming decision-directed. It then remained only to replace the data present at the input to the feedback filter with detected data and thus pass from a recursive linear structure to a recursive non-linear structure (DFE). That idea has turned out to be most advantageous in the sense that it makes it possible to equalize channels where other self-learning algorithms fail Nevertheless, in spite of the original nature of the idea and its undoubted contribution to the field of self-learning equalization, that structure possesses various points that would appear to be capable of being improved.

In the same year, O. Macchi et al. [14] proposed a structure essentially constituted by a predictor, automatic gain control (AGC), and an all-pass filter including a recursive portion, the predictor serving to provide amplitude equalization for the channel, the all-pass filter providing phase equalization, and the AGC restoring the proper level and dealing with the problem of carrier recovery. An increase in convergence speed was undoubtedly obtained, however the system was unsuitable for optimum structural reversibility without degrading performance, and that ran the risk of constituting a major handicap with time-varying channels.

The essential difference compared with the present invention lies in the fact that the phase equalizer (all-pass filter) described in [14] also includes a recursive portion. Consequently, on passing to tracking mode to take full advantage of a non-linear structure with decision feedback, it was necessary, on pain of considerable performance degradation, to replace the two feedback filters by a single (recursive) equivalent filter. It then became impossible to go back to the earlier configuration in the event of the channel worsening. In contrast, the circuit of the invention includes only one purely recursive predictor which distinguishes it significantly from the circuit described in [14].

The invention provides an equalizer circuit for a digital communications system, the circuit including automatic gain control means, carrier recovery means, data phase equalization means, and a predictor for data amplitude equalization, together with a decision circuit, and being characterized in that the predictor is purely recursive, the phase equalizer is purely transversal, and the relative positions of those two elements are interchangeable, means for evaluating performance in terms of decision error and for causing the two elements to be interchanged in application of a criterion for evaluating the difficulty of reception, the predictor being upstream and optimized in adaptive and self-learning manner to whiten its own output while the phase equalizer is downstream and optimized in adaptive manner during periods of difficult reception, whereas the predictor is downstream and the phase equalizer is upstream, both being optimized jointly in adaptive manner to minimize decision error between the output of the decision circuit and its input during periods of easy reception.

The proposed structure is adaptive, which constitutes a worthwhile original feature.

During convergence, it amounts to concatenating: real gain; a purely recursive predictor; a transversal linear filter; and a phase corrector. The presence of the whitening filter upstream from the linear transversal filter enables the transversal filter to converge more quickly.

In tracking mode, the structure used is identical to the above with the exception that the predictor and transversal filters are interchanged.

Thus, this recursive circuit possesses the two advantages of being entirely self-learning (blind) in its initial mode and of tending gradually towards a DFE type circuit that is decision controlled using a criterion of minimizing MSE, and it remains naturally in that state so long as the channel does not degrade excessively. However, when propagation conditions make the channel too difficult and as a result the MSE exceeds a certain threshold, the circuit then switches over to its blind configuration, corresponding to convergence mode.

As a result, because of the adaptivity of its structure, the circuit of the invention makes it possible to achieve performance that is most advantageous both with respect to convergence and with respect to tracking. This essential property makes it capable of adapting to channel fluctuations in severe situations, unlike conventional equalizers of the prior art.

In addition, the circuit provided by the invention is particularly well adapted to time-varying channels, and in particular mobile radio channels, ionospheric channels, tropospheric channels, and acoustic submarine channels.

The invention also provides an equalizing method for the receiver of a digital communications system.

Other characteristics and advantages of the invention appear further from the following description.

BRIEF DESCRIPTION OF THE DRAWINGS

The description is purely illustrative and non-limiting It should be read with reference to the accompanying drawings, in which.

GENERAL DESCRIPTION

The equalizer circuit of the invention has two different structures depending on whether it is in convergence mode (mode 1) or in tracking mode (mode 2), i.e. under steady-state conditions. These are the two structures shown in FIGS. 3 and 4.

Figure 3:
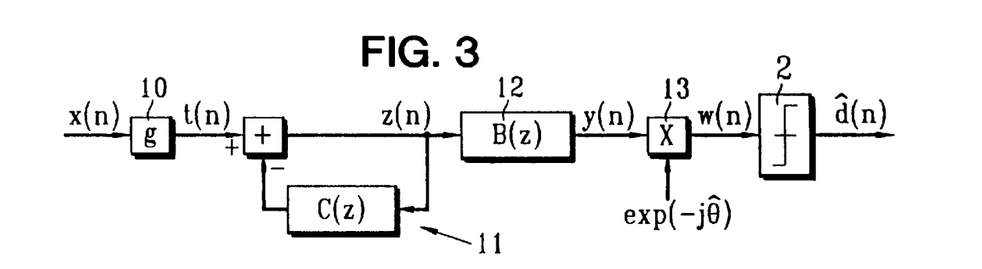
FIG. 3 is a diagram showing the structure of a circuit constituting one possible embodiment of the invention during convergence.
Figure 4:
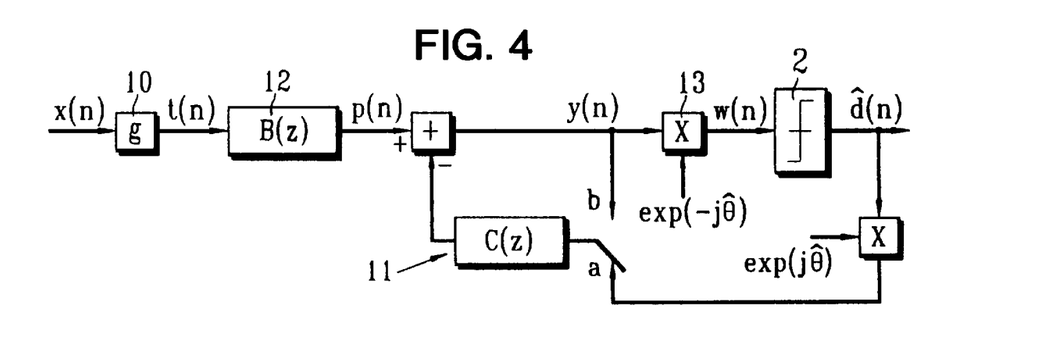
FIG. 4 is a diagram showing the structure of a circuit constituting one possible embodiment of the invention during tracking.

In the structure used during convergence, a linear and purely recursive predictor (whitening filter) precedes a transversal filter which is itself self-learning (blind). In tracking mode, the transversal filter is disposed upstream of the recursive filter which is then supplied with detected data. The optimality criterion then become that of minimizing MSE both for the transversal linear portion and for the recursive portion. There is thus a structural modification accompanied by a simultaneous change of optimality criterion.

Thus, depending on the degree of severity of the channel and on the criterion for measuring output signal performance, e.g. MSE estimated in the least squares sense (RLS), the circuit switches from a self-learning linear recursive structure as shown in FIG. 3 to a non-linear recursive structure (DFE) shown in FIG. 4, or conversely from a decision directed DFE type structure to a self-learning linear recursive structure.

The structures corresponding firstly to convergence mode and secondly to tracking mode are described below.

Mode 1: convergence, periods of difficult reception

The structure corresponding to the convergence configuration shown in FIG. 3 comprises automatic gain control 10 of real type g, a predictor 11 having a transfer function $1/(1+C(z))$, a transversal filter 12 having a transfer function B(z), and a circuit 13 for compensating phase error. It is important to observe that the AGC, characterized by its gain g, can be situated at other points in the system, and in particular between the purely recursive predictor 11 and the transversal filter 12, or either upstream or downstream from the phase error compensating circuit 13.

Gain g is updated on a blind criterion, the predictor 11 on a whitening criterion (amplitude equalization), and the transversal filter 12 on a blind criterion implying the use of statistics of order greater than two (phase equalization). For updating the coefficients of the transversal portion, various algorithms can be used, and in particular those described in above-mentioned articles 1 to 14.

Carrier recovery 13, i.e. estimating residual phase error and compensating it by multiplying by $\exp(-j\hat{\theta})$ is performed, for example, using a criterion of minimizing MSE. The error signal generated can then be filtered so as to reduce to a second-order phase lock loop (or to a loop of order greater than two, depending on the type of filter used). This circuit 13 can also be situated at various points in the system, and in particular between the predictor 11 and the transversal filter 12.

During this convergence mode, carrier recovery 13 is the only function to be decision directed. The other functions are optimized on criteria that do not rely in any way on decisions taken by the appropriate circuit (threshold circuit).

Consequently, this first mode is entirely self-learning (blind).

Better, each of the individual circuit portions possesses its own appropriate optimality criterion, thereby making the overall structure very robust.

In addition, the predictor 11 whitens the data present at the input of the transversal filter 12 which provides a non-negligible advantage in terms of convergence time, specifically because the self-correlation matrix of the input signal is then better conditioned.

Also, the respective positions of the AGC 10 and of the carrier recovery circuit do not, a priori, have any significance in absolute terms, ignoring any considerations relating to possible structural constraints. Thus, the AGC 10 (characterized by g) can be situated equally well between the predictor 11 and the transversal filter 12, or upstream or downstream of the phase error compensating circuit 13. Nevertheless, from the point of view of structural constraints, a position that is advantageous, at least with respect to gain g, appears to be that shown in the figures. If the AGC were to be situated upstream or downstream of the phase error compensating circuit 13, then it would be necessary to use division in tracking mode (which is always difficult to implement), whereas situating it between the predictor and the transversal filter requires output data from the predictor and input data to the transversal filter to be stored, but that is not much of a penalty.

Mode 2: tracking, periods of easy reception

Once the channel has been substantially equalized, which situation can be perceived, for example, by observing the estimated MSE in the (recursive) least squares sense, and more precisely by comparing said value with a threshold, the recursive predictor 11 having the transfer function $1/(1+C(z))$ and the transversal linear filter having the transfer function $B(z)$ are interchanged.

The new structure obtained in this way (switch in position b in FIG. 4) is entirely equivalent to the preceding structure given that the circuit is linear. It then remains to replace the data y(n) at the input to the feedback filter with the phase-corrected detected data, i.e. $\hat{d}(n)\exp(j\hat{\theta}(n-1))$, thus returning to the conventional DFE structure (switch in position a), that is decision directed in application of the criterion of minimizing MSE.

Figure 5:
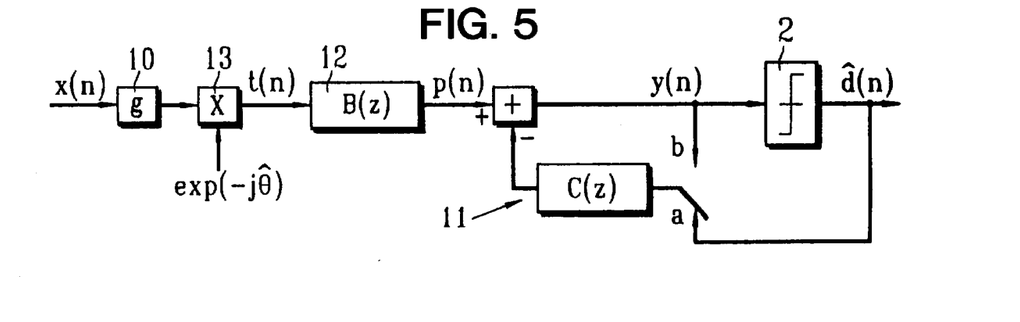
FIG. 5 is a diagram showing a possible variant of the structure for tracking mode.

Naturally, if multiplication by the term $\exp(-j\hat{\theta}(n-1))$ is performed upstream, i.e., for example, at the input of the circuit as shown in FIG. 5, then the data y(n) is replaced by detected data $\hat{d}(n)$ purely and simply, but always in progressive manner.

Thus, on transition from mode 1 to mode 2, the observation vector at the input to the recursive portion is constituted by signals $\hat{d}(n-1)$, y(n-2), y(n-3), y(n-M). In contrast, when going from mode 2 to mode 1, the observation vector at the input of the recursive portion is constituted by the signals y(n-1), $\hat{d}(n-2)$, $\hat{d}(n-3)$, ..., $\hat{d}(n-M)$.

Also, it remains possible to integrate the AGC 10 in the linear transversal filter 12 B(z) by locking g to its preceding value, with this action being optional only, since on very time-varying signals, it is desirable to keep open the option of adapting the AGC.

This change in structure is entirely reversible This property is most advantageous since under severe conditions it makes it possible to return gradually to convergence mode, i.e. to a completely self-learning mode, with the purely recursive predictor 11 again seeking to equalize the channel in amplitude and with the transversal filter 12 subsequently seeking to equalize it in phase.

In contrast, when the channel becomes less severe, that gives rise, amongst other things, to a reduction in the associated MSE (e.g. estimated in the least squares sense (RLS)), so the system switches again to a recursive structure with decision feedback, and so on. In this respect, the nature of the present system is clearly both original and particularly attractive.

So far as the inventors are aware, there exists at present no circuit of this type that performs structural permutation, in other words that interchanges the upstream and downstream portions of the equalizer.

In parallel with this structural permutation, the cost functions required for updating the coefficients in the transversal and recursive portions are changed. In mode 1, these cost functions rely exclusively on knowledge of the statistics of the input signal, whereas in mode 2, the optimality criterion used is minimizing MSE. These aspects are clearly described in the technical appendix.

Finally, and this constitutes another original feature of the circuit, it is possible during mode 2 and on the basis of an estimate of the likelihood of the detected data sample, to replace the phase-corrected data i.e. $\hat{d}(n).\exp(j\hat{\theta}(n-1))$ by data y(n), as shown in the diagram of FIG. 4, when the likelihood of the estimated data is insufficient. This provides a corresponding reduction in the impact of isolated decision errors despite an increase in the associated MSE. This strategy provides additional robustness to the above-described circuit, providing an estimate of the likelihood is available. If there is no such estimate, the switch is in position a.

Thus, the predictor can be fed either with phase-corrected estimated data $\hat{d}(n)$ obtained at the output from the decision circuit 2, or else with data output by the predictor 11. To this end, the circuit may include means for switching between these two feeds (b and a in FIG. 4) as a function of the above-mentioned criterion for evaluating the likelihood of the estimated data.

DETAILED DESCRIPTION OF AN EMBODIMENT

An embodiment of the equalizer circuit of the invention is described below in detail.

Convergence mode, periods of difficult reception

The equations governing the operation of the circuit are the following:

$$t(n)=x(n)g(n-1) \tag{I-1}$$

$$z(n)=t(n)-[z(n-1),\ldots,z(n-N)]C(n-1) \tag{I-2}$$

$$y(n)=B^T(n-1)Z(n) \tag{I-3}$$

with:

$$Z(n)=[z(n-1),\ldots,z(n-L)]^T$$

and:

$$B=[b_0, \ldots, b_{L-1}, b_L]^T$$

$$w(n)=y(n).\exp(-j\hat{\theta}(n-1)) \qquad (I\text{-}4)$$

By way of example, the vector B may be initialized as follows: $B=[0\ 0\ 0\ 0\ 1]^T$, while C is the zero vector of dimension N. It is recalled that N must naturally be selected to greater than or equal to the number of zeros in the transfer function F(z) of the transmission channel. Similarly, the size (L+1) of the transversal equalizer must be selected to be large enough to be able to process appropriately any zeros lying outside the unit circle and in the immediate vicinity thereof.

The real gain g is updated in application of the criterion initially recommended in [1] and [2].

$$G(n)=G(n-1)+\mu_G[1-|z(n)|^2]$$

$$g(n) = \sqrt{|G(n)|} \qquad (I\text{-}5)$$

or else:

$$g(n)=|G(n)| \qquad (I\text{-}5b)$$

Phase error can be updated using a similar strategy of decision-directed minimization of (estimated) square error. The error signal is conventionally filtered by a digital filter (phase advance integrator), characterized by two coefficients $G_1$ and $G_2$:

$$e(n)=Im\{w(n)[d(n)-w(n)]^*\} \qquad (I\text{-}6)$$

$$s(n) = (e \otimes f)(n) \text{ and } Z\{f(n)\} = G_1 + \frac{G_2}{1-z^{-1}} \qquad (I\text{-}7)$$

$$\hat{\theta}(n)=\hat{\theta}(n-1)+\mu_\theta s(n) \qquad (I\text{-}8)$$

A priori, phase updating should start from the beginning, particularly on channels having a discrete impulse response of the complex type. In contrast, on channels having an impulse response that is real, it is possible to examine faster convergence when updating is inhibited during the first iterations. This is explained by the fact that under such circumstances it is advantageous to use decision-directed criteria only once a portion of the ISI has been eliminated, thereby making it possible to increase the reliability of the detected data.

The signal z(n) is whitened by minimizing its variance $E\{|z(n)|^2\}$ by a "stochastic gradient" technique (SGLMS algorithm). It is known that the solution which is optimal in the Wiener sense is that which makes the prediction error z(n) orthogonal to the various components of the vector Z(n). Under such conditions, the samples z(n) are non-correlated on a finite horizon of duration N.

The equation for updating the vector C is then as follows:

$$C(n)=C(n-1)+\mu_c z(n)[z(n-1), \ldots, z(n-N)]^H \qquad (I\text{-}9)$$

where the exponent H designates the transposition and conjugation operation.

To update the vector B, a certain number of cost functions, and in particular Godard's function (constant modulus algorithm) have been tried. Also, the inventors have investigated combined strategies associating Godard's function with a strategy of the Benveniste-Goursat type. They have also examined these various criteria over a number of channels, including those of Porat and Friedlander [11] and of Macchi [13].

The iterative technique implemented is the "stochastic gradient" technique (it could equally well be the recursive least squares technique). The various error signals corresponding to the above-mentioned strategies are expressed as follows:

$$e_{God}(n)=y(n)[1-|y(n)|^2] \qquad (I\text{-}10)$$

Godard [6]

$$e_{sw}(n)=-y(n)|y(n)|^2 \qquad (I\text{-}11)$$

Shalvi-Wenstein [10]

$$e_{DD}(n)=[\hat{d}(n).\exp(j\hat{\theta}(n-1))-y(n)]LMS \qquad (I\text{-}12)$$

(Decision directed)

$$e_{Benv}(n)=k_1^{SM}e_{DD}(n)+k_2 \cdot e_{God}(n)|e_{DD}(n)| \qquad (I\text{-}13)$$

Benveniste-Godard

Whatever the criterion retained, i.e. whatever the cost function $e_x(n)$, the equation for updating the vector B is written as follows:

$$B(n)=B(n-1)+\mu_B e_x(n)Z^*(n) \qquad I\text{-}14$$

It will be observed that whatever the criterion retained, the algorithm is indeed self-learning. The criteria which appear to be fastest over all simulations are those of Godard, optionally associated with Benveniste strategies that make it possible to switch smoothly from a self-learning criterion (Godard) to a final (tracking) criterion of the decision directed LMS type.

More precisely, updating of B is started on a Godard criterion, and the system is then switched to a Benveniste type strategy when the variance z(n), as estimated in the least squares sense, reaches a given threshold. A typical forgetting factor for this estimation has been fixed at $\lambda=0.99$.

Also, the initial vector B(0) has been arbitrarily set so that $B(0)=[0\ 0\ \ldots\ 1]^T$. The initial position and value of the reference coefficients can naturally be changed. In other words, the transversal linear filter need not be purely anti-causal.

In any event, the restoration delay δ is equal to the size of the anti-causal portion of the transversal filter 12.

Tracking mode, periods of easy reception

This mode begins when the estimated MSE in the recursive least squares (RLS) sense drops below a given fixed threshold, e.g. 0.2 for 4-PSK. The equation for updating the estimated MSE is then as follows:

$$MSE(n)=\lambda MSE(n-1)+(1-\lambda)|\hat{d}(n)\exp(j\hat{\theta}(n-1))-y(n)|^2 \qquad (II\text{-}0)$$

$$MSE(0)=1$$

In this case, the predictor 11 and the linear transversal filter 12 are interchanged and, in addition, DFE mode is used, i.e. y(n) is replaced by the previously phase-corrected detected data i.e. d̂(n).exp(jθ̂(n−1)) in the upstream portion.

The equalizer thus passes overall from a linear recursive structure to a non-linear recursive structure (DFE).

In addition, the cost functions are changed and B and C are updated using the criterion of minimizing MSE (decision directed SGLMS algorithm). This change is naturally reversible, both with respect to structure and with respect to cost functions.

In parallel with the above two actions, it is also possible to lock the real gain g(n) to its preceding value, in which case the transversal filter 12 is treated as a conventional linear transversal filter capable, in this respect, of taking care of adaptation for automatic gain control. In other words, the final structure is then entirely equivalent to that of a decision feedback equalizer (DFE), with the advantage of being capable of returning simply to a completely blind structure that is recursive and linear whenever the estimated MSE exceeds the critical threshold.

The equations for updating the algorithm are as follows:

$$t(n)=x(n)g(n-1) \qquad (II-1)$$

$$p(n)=B^T(n-1)T(n) \text{ with } T(n)=[t(n),\ldots t(n-L)]^T \qquad (II-2)$$

$$y(n)=p(n)-C^T(n-1)Y(n) \qquad (II-3)$$

$$Y(n)=[\hat{d}(n-1).\exp(j\hat{\theta}(n-2)),\ldots,\hat{d}((n-N).\exp(j\hat{\theta}(n-N-1)))]^T \qquad (II-4)$$

In parallel, it is necessary to calculate the following expressions:

$$z(n)=t(n)-[z(n-1),\ldots,z(n-N)]C(n-1) \qquad (II-5)$$

$$Z(n)=[z(n), z(n-1),\ldots,z(n-L)]^T \qquad (II-6)$$

The real gain g can be updated using the criterion used in convergence mode, or else this gain can be integrated in updating the vector B. Phase error updating is performed using the same strategy as during the initial mode.

The equations for updating the vectors B and C are those of a conventional decision driven LMS algorithm, i.e.:

$$B(n)=B(n-1)+\mu_B[\hat{d}(n)\exp(j\hat{\theta}(n-1))-y(n)]T^*(n) \qquad (II-7-a)$$

corresponding to the switch in position a (decision feedback equalizer).

$$B(n)=B(n-1)+\mu_B[\hat{d}(n)\exp(j\hat{\theta}(n-1))-y(n)]Z^*(n) \qquad (II-7-b)$$

corresponding to the switch in position b.

$$C(n)=C(n-1)+\mu_C[\hat{d}(n)\exp(j\hat{\theta}(n-1))-y(n)]Y^*(n) \qquad (II-8)$$

Finally, during tracking, the AGC 10 can be integrated in the linear transversal filter, in which case it suffices to lock the parameter g to its preceding value, with this being advantageous particularly for non-varying channels. Under such conditions, the system reduces clearly to a DFE type structure whose performance characteristics are known. However, when the number of decision errors reaches a critical threshold, a conventional DFE diverges because of the decision error propagation phenomenon. In contrast, with the novel strategy, when severe conditions make the estimated MSE exceed the critical threshold, this causes the circuit to change its structure, enabling it to return to self-learning mode. A priori there is thus no longer any major risk of divergence due to the error propagation phenomenon. This is a remarkable feature.

Finally, restoration delay is always equal to the length L of the anti-causal portion of the linear transversal equalizer, and it is thus fixed by the initial position of the reference coefficient. This has been verified over several severe mixed-phase channels.

PERFORMANCE

The above-described circuit of the invention and the associated algorithms have been successfully tested on real submarine acoustical communications signals in particularly reverberating contexts (test basin and horizontal transmission in shallow sea).

In parallel, the operation of the circuit and the associated algorithms has been simulated for 4-PSK (or Q-PSK) over Macchi and over Porat Friedlander channels. In each case, data variance was normalized to 1. The signal-to-noise ratio was fixed at 15 dB, the dimension N of the predictor 11 being selected to be equal to 5, L being fixed at 19, thus giving rise to a linear transversal size equal to 20.

For each test, a random frequency offset ΔF was simulated such that the product ΔF×T was uniformly distributed over the range [0 to 0.002], T conventionally representing one symbol time. In parallel, for each test, we also injected an initial phase error that was uniformly distributed over the range [0 to 2π].

Porat and Friedlander channel

This channel had zeros on either side of the unit circle, and its discrete impulse response was as follows:

$$f=[2-0.4^*j,\ 1.5+1.8j,\ 1,\ 1.2-1.3^*j,\ 0.8\ +1.6^*j]$$

Figure 6A:
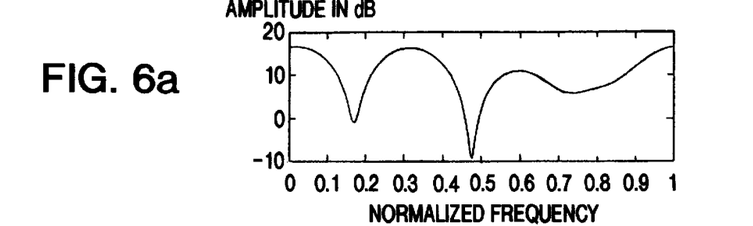
FIGS. 6a and 6b are graphs giving amplitude and phase response as a function of frequency for a Porat and Friedlander type channel.
Figure 6B:
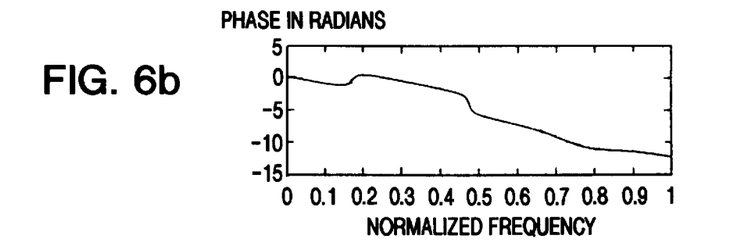
Figure 7:
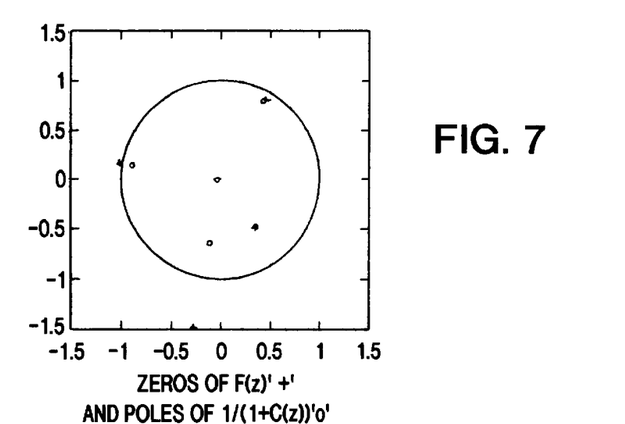
FIG. 7 is a diagram in the complex plane showing the positions of the zeros of the transfer function of the transmission channel corresponding to FIGS. 6a and 6b (zeros symbolized by +), and also the poles of the transfer function $1/(1+C(z))$ of the predictor (poles symbolized by o) relative to the unit circle.

It will be observed that this impulse response is complex, unlike that used in the following example. FIGS. 6a and 6b show the frequency response of this channel in phase and in amplitude, and FIG. 7 shows the positions of the zeros of the transfer function relative to the unit circle.

Then, on a special selection, the final positions of the poles of the transfer function 1/(1+C(z)) of the predictor 11 were examined. In accordance with theory, it should be observed that there are two internal poles symmetrical with the two external zeros of the transfer function F(z) of the transmission channel (mixed-phase type channel).

Figure 8A:
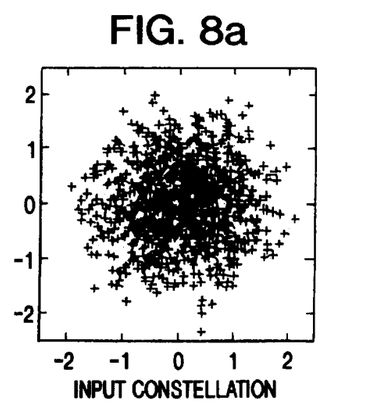
FIGS. 8a and 8b show the constellations in 4-PSK that correspond respectively to the input signal and to the output signal from the circuit of the invention.
Figure 8B:
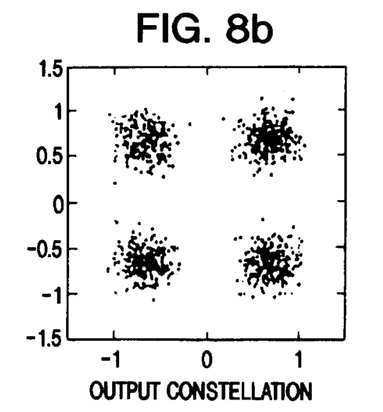

FIGS. 8a and 8b show the starting constellation and also the constellation of the signal w(n) for the most recent 1,000 values.

Figure 9A:
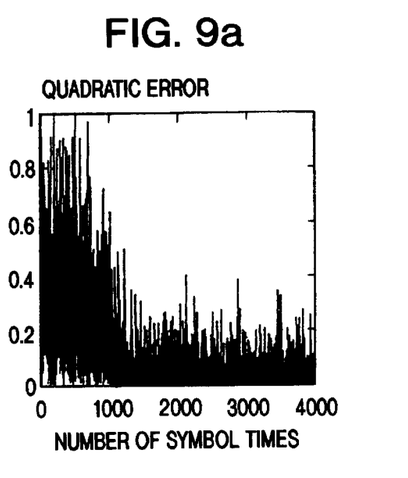
FIGS. 9a and 9b are graphs respectively showing instantaneous square error and square error estimated in the least squares sense, both plotted as a function of the number of symbols received.
Figure 9B:
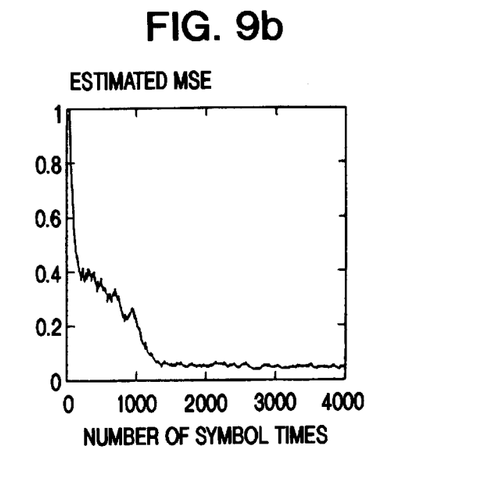

Also, still in the context of a particular file, FIGS. 9a and 9b show how the instantaneous square error and the estimated MSE in the least squares sense (RLS) vary. It can be seen that convergence is situated at about 1,000 iterations, which feature is quite remarkable, and much faster than in prior art circuits.

Figure 10:
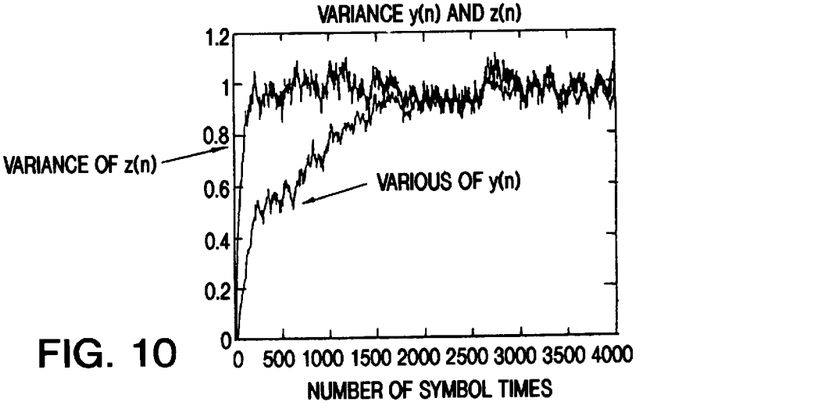
FIG. 10 is a graph on which there are plotted curves of variance in the signals y(n) and z(n), as estimated in the least squares sense, and as a function of the number of symbols received.

Variation in RLS estimated variance of y(n) and z(n) are given in FIG. 10. Here again, it can be seen that convergence takes place at about 1,000 iterations.

Figure 11:
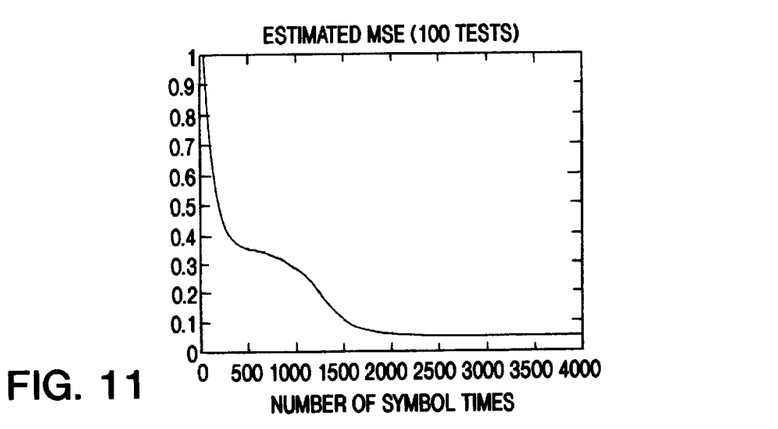
FIG. 11 is a graph on which MSE is plotted as a function of number of symbols (averaged over 100 trials)

Finally, FIG. 11 shows how estimated MSE varies. This estimate was obtained by taking 100 random trials and taking the arithmetic mean of the RLS estimated MSEs. This result serves to verify the power of the new circuit and the associated algorithms.

It can be seen in particular that when using 4-PSK type modulation, the convergence time is about 1,000 symbol times for algorithms of the "stochastic gradient" type. By way of comparison, a self-learning linear transversal equalizer of the kind described by Godard typically requires fifteen thousand symbol times and it gives rise to an increase of about 3.5 dB in MSE.

Macchi channel

This channel has zeros on either side of the unit circle, its discrete impulse response being the following:

f=[0.8264, 001653, 008512, 001636, 081]

Figure 12A:
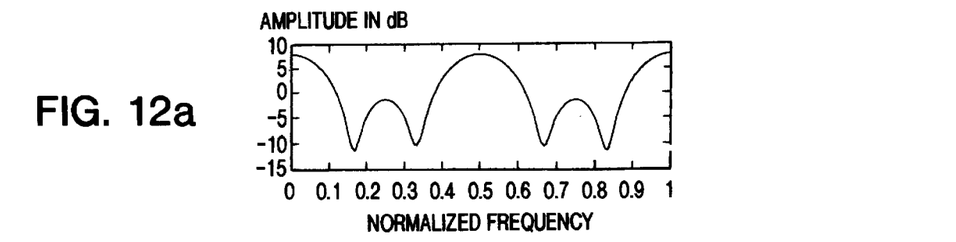
FIGS. 12a and 12b are graphs showing the amplitude and phase response as a function of frequency for a mixed-phase Macchi type channel.
Figure 12B:
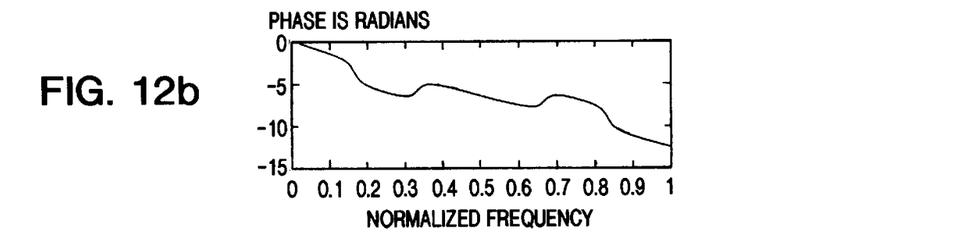

FIG. 12 shows the frequency response of this channel in phase and in amplitude, together with the positions of the zeros of the transfer function relative to the unit circle.

Figure 13:
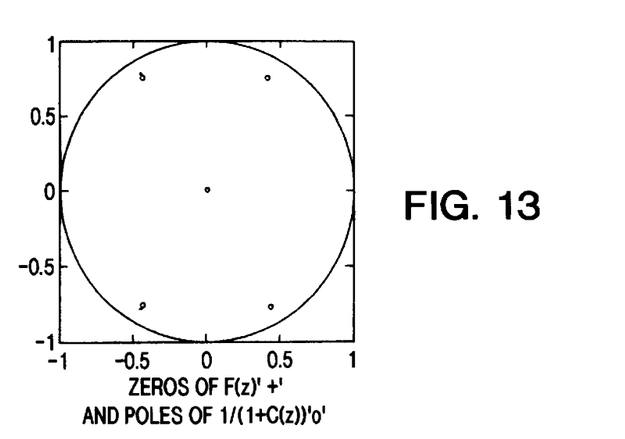
FIG. 13 is a diagram in the complex plane showing the positions of the zeros of the transmission channel transfer function corresponding to FIGS. 12a and 12b (zeros symbolized by +), together with the poles of the transfer function $1/(1+C(z))$ of the predictor (poles symbolized by o), relative to the unit circle.

On a particular trial, the final positions of the poles of the transfer function $1/(1+C(z))$ of the predictor 11 were examined. In accordance with theory, it will be observed in particular that there are two internal poles symmetrical with two external zeros of the transfer function F(z) of the transmission channel.

Figure 14A:
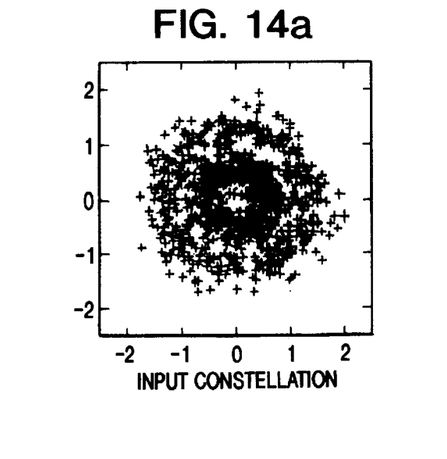
FIGS. 14a and 14b show the 4-PSK constellations corresponding respectively to the input signal and to the output signal of the circuit of the invention.
Figure 14B:
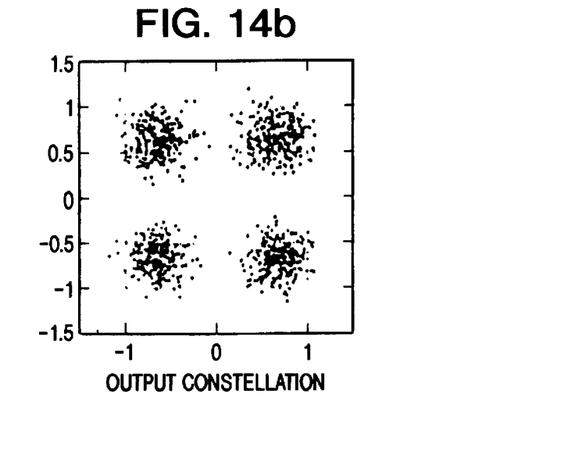

FIG. 14 shows the starting constellation and also the constellation of the signal w(n) over the most recent 1,000 values. ISI was considerably reduced by our circuit.

Figure 15A:
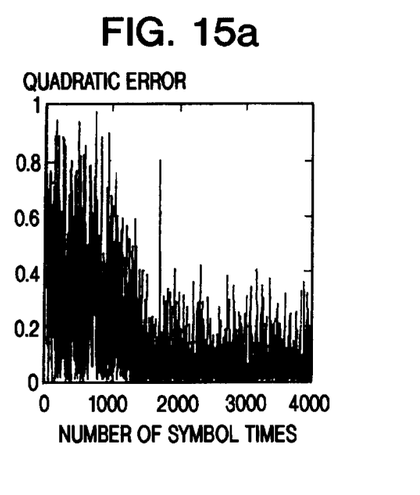
FIGS. 15a and 15b are graphs respectively showing instantaneous square error and square error estimated in the least squares sense as a function of the number of symbols received.
Figure 15B:
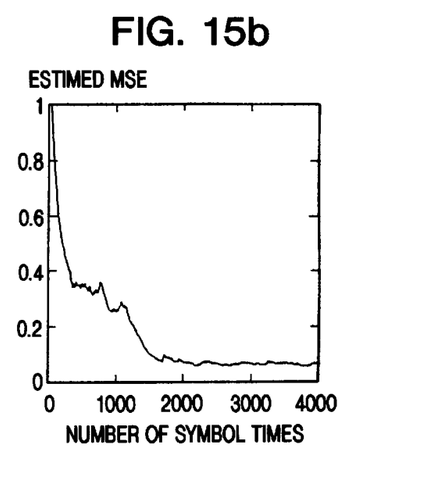

Also, still in the context of a special file, FIG. 15 shows how instantaneous square error and RLS estimated MSE varied, showing again that convergence takes place at around 1,000 iterations.

Figure 16:
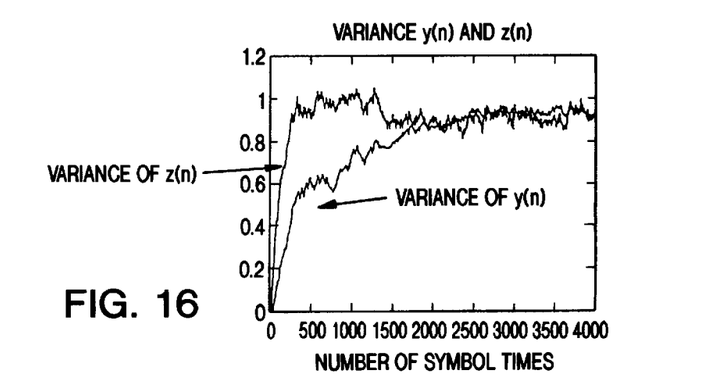
FIG. 16 is a graph on which there are plotted curves showing the variance in the signals y(n) and z(n), as estimated in the least squares sense.

Simultaneously, FIG. 16 shows how estimated variances for y(n) and z(n) vary. This estimation was performed in the recursive least squares sense (RLS) with a forgetting factor of 0.99.

Figure 17:
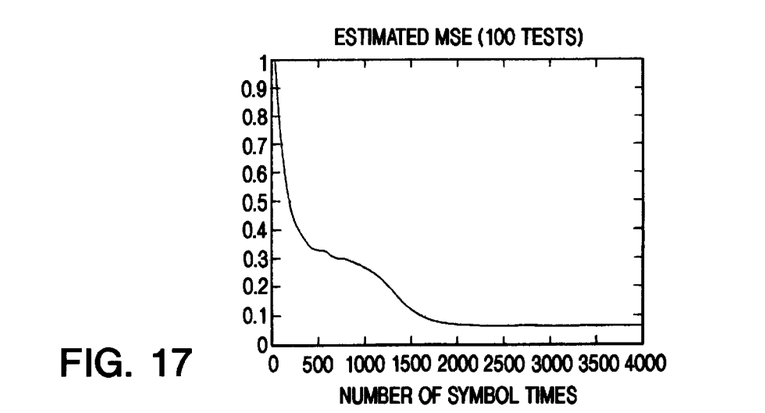
FIG. 17 is a graph on which there is plotted MSE as a function of number iterations (averaged over 100 trials)

Finally, FIG. 17 shows how MSE varies after 100 trials. This result serves to corroborate the power of the new algorithm on this new channel.

APPLICATIONS

The fields covered by this invention naturally include radiotelecommunications, mobile radio, and submarine telecommunications by sound, where it is convention at present to use decision feedback non-linear equalizers (DFE) in particular. These channels all suffer from the particular feature of being highly time-varying and in general they have long impulse responses. Communications by cable can also take advantage of this novel invention, given that they are generally characterized by impulse responses covering several symbol times and are thus poorly suited to using optimal receivers.

The types of modulation concerned by this invention are essentially linear modulation such as two or four phase state modulation (2-PSK, 4-PSK), amplitude modulation (AM), and amplitude modulation on two carriers in quadrature (QAM), all of which kinds of modulation are used widely in present-day applications.

The field over which the present invention is valid also extends to receivers using space or frequency diversity techniques for which the optimal structure in the sense of minimizing MSE is constituted, on each path, by a linear transversal filter 12 (step size T) and a recursive filter.

This structure can also be extended to equalizers of the fractionally-spaced type, i.e. to equalizers using more than one sample per symbol time, as compared with equalizers that are "synchronous" or "T-spaced". Such fractionally-spaced circuits generally provide an improvement in performance terms due essentially to the fact that they are relatively insensitive to how the sampling instant is chosen, unlike synchronous equalizers.

Figure 18:
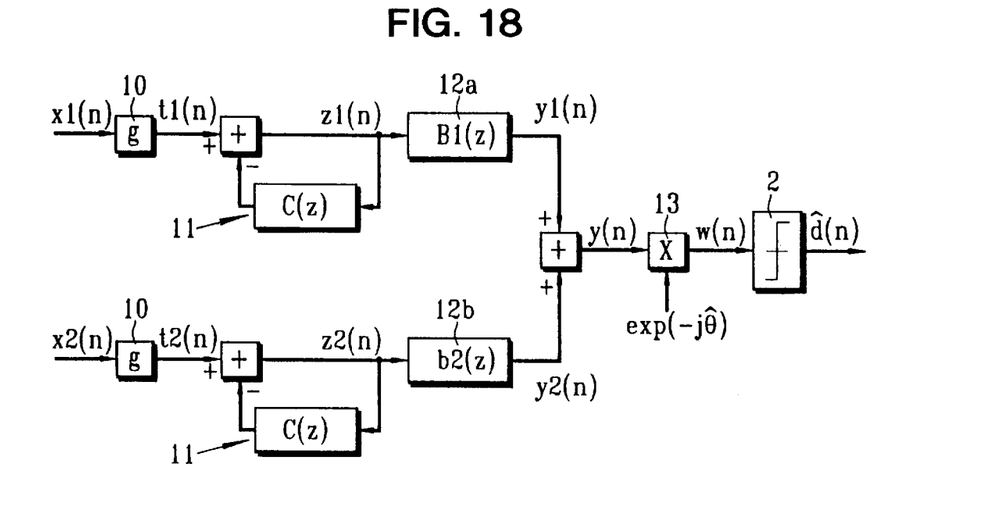
FIGS. 18 and 19 are block diagrams similar to those of FIGS. 3 and 4 and showing a fractionally-spaced equalizer of the invention.
Figure 19:
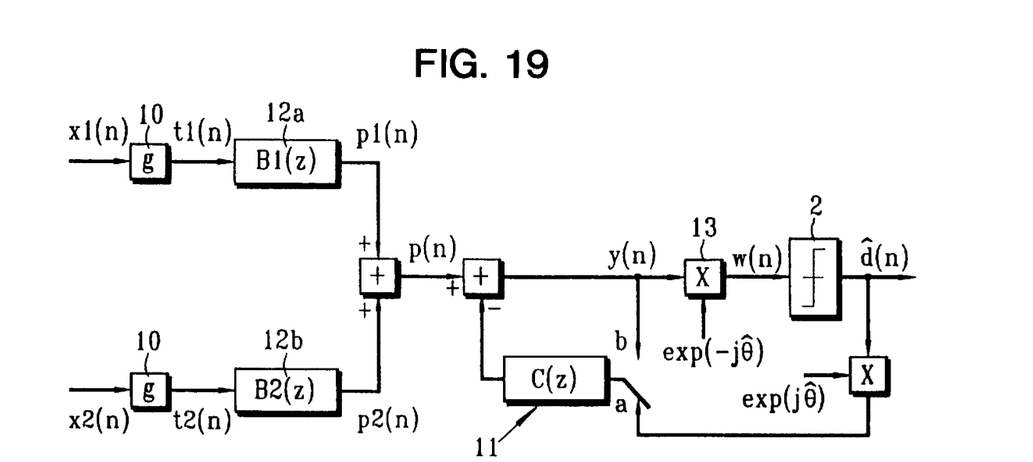

One example of a possible embodiment of a fractionally-spaced equalizer is shown in FIGS. 18 and 19. During a convergence period or a period of difficult reception, the structure of the circuit is as shown in FIG. 18. The interleaved signals written respectively x1(n) and x2(n) are given by the following expressions:

x1(n)=x(nT+τ)

x2(n)=x(nT+τ-Δ)

with, for example and in entirely conventional manner, Δ=T/2, and τ designating the sampling phase.

The purely recursive predictor 11 of transfer function $1/(1+C(z))$ is common to both paths to which the signals x1(n) and x2(n) are applied and is optimized to whiten the output z1(n). The AGC 10 is updated to match the mean power of the signal z1(n) at the output from the predictor 11 to its nominal level. The transversal linear filters are referenced 12a and 12b. They are distinct for each of the two signals and they are characterized by their respective transfer functions B1(z) and B2(z). They constitute the phase equalizer and they may be adapted by any of the above-described algorithms. To understand this, it suffices to observe that the signal y(n) can also be written:

$y(n)=B^T(n-1)Z(n)$ $B^T=[B1^T \ B2^T]$ $Z(n)^T=[Z1(n)^T Z2(n)^T]$ $Z1(n)=[z1(n), z1(n-1), \ldots, z1(n-L)]^T$ $Z2(n)=[z2(n), z2(n-1), \ldots, z2(n-L)]T$ $B1=[b_{0,1}, \ldots, b_{L-1,1}, b_{L,1}]$ $B2=[b_{0,2}, \ldots, b_{L-1,2}, b_{L,2}]$ As in the preceding circuit, once the MSE as estimated in the least squares sense drops below a certain threshold, the structure of the circuit is then changed to that shown in FIG. 19. Simultaneously, the optimality criterion for adapting the various parameters then becomes minimizing the MSE. The corresponding equations are entirely similar to those described above.

Also, and as before, the locations of the gain g and of the carrier recovery circuit can be situated at various other points in the system.

Finally, and from a general point of view, the above-described algorithms associated with the circuit of the invention make use of an iterative technique of the "stochastic gradient" type. Naturally, a different approach and in particular the "recursive least squares" approach with a forgetting factor can be envisaged to accelerate the convergence process and to provide better tracking of rapid fluctuations in the transmission channel, but only at the cost of an increase in computational complexity.

Also, the means for evaluating performance may compute an MSE between the input and the output of the decision circuit 2 or they may compute, for example, the kurtosis of the input signal to the decision circuit 2. This takes account effectively of the degree of deconvolution of the channel or, in equivalent manner, of the extent to which the equalization process has advanced.

Also, the location of the means 13 enabling phase error to be corrected may naturally be different from that in the above-described variants.

In particular, as a variant of the structure shown in FIG. 5, the locations of the phase correction means 13 and of the filter 12 can be interchanged, with the equations that apply to such a structure being derived straightforwardly from those described above.

This change in structure also makes it possible to omit one complex multiplication since the feedback filter C(z) is then fed directly with detected data d̂(n) instead of with d̂(n).exp (jθ̂(n-1)).

Also, it is possible to imagine using a different strategy for triggering the change in structure and in algorithm. It is possible to use two thresholds $J_1 \leq J_0$ and to switch from mode 1 (convergence) to mode 2 if and only if $MSE(n) \leq J_1$, while switching from mode 2 to mode 1 takes place if and only if $MSE(n) \geq J_0$. This serves in particular to avoid changing over repetitively under certain difficult circumstances.

Finally, a circuit could be imagined that is more complex and in which a circuit corresponding to the initial mode or "convergence" would be kept operating continuously and in parallel, in readiness to take over more quickly in the event of the circuit switching from tracking mode (mode 2) to convergence mode (mode 1) due to poor transmission conditions.

We claim:

1. An equalizer circuit for a digital communications system, the circuit including an automatic gain control circuit, carrier recovery circuit, data phase equalization circuit, and a predictor for data amplitude equalization, together with a decision circuit, wherein an automatic gain control circuit is operable associated with the carrier recovery circuit, the data phase equalization circuit, the predictor, and the decision circuit, and wherein the predictor is purely recursive, the phase equalizer is purely transversal, and the relative positions of those two elements are interchangeable, means for evaluating performance in terms of decision error and for causing the two elements to be interchanged in application of a criterion for evaluating the difficulty of reception, the predictor being upstream and optimized in adaptive and self-learning manner to whiten its own output while the phase equalizer is downstream and optimized in adaptive manner during periods of difficult reception, whereas the predictor is downstream and the phase equalizer is upstream, both being optimized jointly in adaptive manner to minimize decision error between the output (d(n)) of the decision circuit and its input w(n) or y(n) during periods of easy reception.

2. The circuit according to claim 1, wherein the predictor performs iterative optimization by stochastic gradient or by the recursive least squares (RLS) technique.

3. The circuit according to claim 1, wherein the predictor performs iterative optimization by stochastic gradient or by the recursive least squares (RLS) technique.

4. The circuit according to claim 1, wherein during periods of easy reception, automatic gain control is kept at a constant level, with adaptation of gain being performed by the phase equalizer.

5. The circuit according to claim 4, wherein the predictor performs iterative optimization by stochastic gradient or by the recursive least squares (RLS) technique.

6. The circuit according to claim 1, wherein the predictor is fed either with estimated data (d(n)) obtained at the output from the decision circuit and phase corrected (exp(jθ)), or else by data (y(n)) from the output of the predictor, the circuit including means (a, b) for switching between said two feeds as a function of a criterion for evaluating the likelihood of the estimated data at the output from the decision circuit.

7. The circuit according to claim 6, wherein during periods of easy reception, automatic gain circuit is kept at a constant level, with adaptation of gain being performed by the phase equalizer.

8. The circuit according to claim 6, wherein the predictor performs iterative optimization by stochastic gradient or by the recursive least squares (RLS) technique.

9. The circuit according to claim 6, wherein automatic gain control is situated upstream from the predictor and the phase equalizer.

10. The circuit according to claim 1 or 2, wherein the means for evaluating performance in terms of decision error compute an MSE between the estimated data (d(n)) at the output of the decision circuit and the data (w(n)) at its input.

11. The circuit according to claim 10, wherein during periods of easy reception, automatic gain control is kept at a constant level, with adaptation of gain being performed by the phase equalizer.

12. The circuit according to claim 10, wherein during periods of easy reception, automatic gain control is kept at a constant level, with adaptation of gain being performed by the phase equalizer.

13. The circuit according to claim 10, wherein the predictor performs iterative optimization by stochastic gradient or by the recursive least squares (RLS) technique.

14. The circuit according to claim 10, wherein automatic gain control is situated upstream from the predictor and the phase equalizer.

15. The circuit according to claim 10 wherein the carrier recovery means are situated downstream from the transversal filter and from the purely recursive predictor.

16. The fractionally-spaced equalizer for processing more than one sample per symbol time, comprising, an equalizer circuit according to claim 10, the circuit having a predictor common to the interleaved signals and distinct phase equalizers for each of said signals.

17. The use of a circuit according to claim 10, in radiotelecommunications, in mobile radio, or in submarine acoustic telecommunications, or in cable telecommunications.

18. The use of a circuit according to claim 10, for receiving digital communications signals using single or multicarrier modulation, including in particular phase shift keying (PSK), amplitude modulation (AM), and amplitude modulation on two carriers in quadrature (QAM).

19. The circuit according to claim 1 or 2, wherein the means for evaluating performance in terms of decision error compute the kurtosis of the input signal of the decision circuit.

20. The circuit according to claim 10, wherein the predictor performs iterative optimization by stochastic gradient or by the recursive least squares (RLS) technique.

21. The circuit according to claim 19 wherein automatic gain control is situated upstream from the predictor and the phase equalizer.

22. The circuit according to claim 19 wherein the carrier recovery means are situated downstream from the transversal filter and from the purely recursive predictor.

23. The fractionally-spaced equalizer for processing more than one sample per symbol time, comprising, an equalizer circuit according to claim 19, the circuit having a predictor common to the interleaved signals and distinct phase equalizers for each of said signals.

24. The use of a circuit according to claim 19, in radiotelecommunications, in mobile radio, or in submarine acoustic telecommunications, or in cable telecommunications.

25. The use of a circuit according to claim 19 for receiving digital communications signals using single or multicarrier modulation, including in particular phase shift keying (PSK), amplitude modulation (AM), and amplitude modulation on two carriers in quadrature (QAM).

26. The circuit according to claims 1, 2, 5, or 6, wherein automatic gain control is situated upstream from the predictor and the phase equalizer.

27. The circuit according to claim 26, wherein the carrier recovery means are situated downstream from the transversal filter and from the purely recursive predictor.

28. The circuit according to claim 26 wherein the carrier recovery means are situated downstream from the transversal filter and from the purely recursive predictor.

29. The fractionally-spaced equalizer for processing more than one sample per symbol time, comprising, an equalizer circuit according to claim 26 the circuit having a predictor common to the interleaved signals and distinct phase equalizers for each of said signals.

30. The use of a circuit according to claim 26, in radiotelecommunications, in mobile radio, or in submarine acoustic telecommunications, or in cable telecommunications.

31. The use of a circuit according to claim 26, for receiving digital communications signals using single or multicarrier modulation including in particular phase shift keying (PSK), amplitude modulation (AM), and amplitude modulation on two carriers in quadrature (QAM).

32. The circuit according to claims 1, 2, 5, or 6 wherein the carrier recovery means are situated downstream from the transversal filter and from the purely recursive predictor.

33. The fractionally-spaced equalizer for processing more than one sample per symbol time, comprising, an equalizer circuit according to claim 32, the circuit having a predictor common to the interleaved signals and distinct phase equalizers for each of said signals.

34. The use of a circuit according to claim 32, in radiotelecommunications, in mobile radio, or in submarine acoustic telecommunications, or in cable telecommunications.

35. The use of a circuit according to claim 32, for receiving digital communications signals using single or multicarrier modulation including in particular phase shift keying (PSK), amplitude modulation (AM), and amplitude modulation on two carriers in quadrature (QAM).

36. The fractionally-spaced equalizer for processing more than one sample per symbol time, comprising an equalizer circuit according to according to claims 1, 2, 5, or 6, the circuit having a predictor common to the interleaved signals and distinct phase equalizers for each of said signals.

37. The use of a circuit according to claim 36, in radiotelecommunications, in mobile radio, or in submarine acoustic telecommunications, or in cable telecommunications.

38. The use of a circuit according to claim 36, for receiving digital communications signals using single or multicarrier modulation including in particular phase shift keying (PSK), amplitude modulation (AM), and amplitude modulation on two carriers in quadrature (QAM).

39. The use of a circuit according to claims 1, 2, 5, or 6, in radiotelecommunications, in mobile radio, or in submarine acoustic telecommunications, or in cable telecommunications.

40. The use of a circuit according to claim 39, for receiving digital communications signals using single or multicarrier modulation including in particular phase shift keying (PSK), amplitude modulation (AM), and amplitude modulation on two carriers in quadrature (QAM).

41. The use of a circuit according to claims 1, 2, 5, or 6 for receiving digital communications signals using single or multicarrier modulation, including in particular phase shift keying (PSK), amplitude modulation (AM), and amplitude modulation on two carriers in quadrature (QAM).

42. An equalizing method for a receiver of a digital communications system having automatic gain control means, carrier recovery means, means for data phase equalization, and a predictor for data amplitude equalization, the method further comprising the predictor is purely recursive, the phase equalizer is purely transversal, and the relative positions of those two elements are interchangeable, and in that performance is evaluated in terms of decision error and the two elements are interchanged in application of a criterion for evaluating the difficulty of reception, the predictor being upstream and optimized in adaptive and self-learning manner to whiten its own output while the phase equalizer is downstream and optimized in adaptive manner during periods of difficult reception, whereas the predictor is downstream and the phase equalizer is upstream, both being optimized jointly in adaptive manner to minimize decision error between the output ($d(n)$) of the decision circuit and its input ($w(n)$ or $y(n)$) during periods of easy reception.

* * * * *

UNITED STATES PATENT AND TRADEMARK OFFICE
CERTIFICATE OF CORRECTION

PATENT NO.   : 5,909,466
DATED        : June 1, 1999
INVENTOR(S)  : Labat et al.

It is certified that error appears in the above-identified patent and that said Letters Patent is hereby corrected as shown below:

Item [56], under the heading "Foreign Paten Documents," delete "A-0 512 712 4/1992 European Pat. Off. ............... H04L 3/25" and insert -- A-0 512 712  4/1992 European Pat. Off. .............. H04L 25/03 --.

Column 4,
Line 8, delete "algorithms fail Nevertheless, in spite of" and insert -- algorithms fail. Nevertheless, in spite of --.

Column 5,
Line 24, delete "non-limiting It should be" and insert -- non-limiting. It should be -- .

Column 7,
Line 62, delete "y(n-3), y(n-M)." and insert -- y(n-3),..., y(n-M). --.

Column 8,
Line 4, delete "reversible This property" and insert -- reversible. This property -- .
Line 59, delete "Z(n)=[z(n-1),..., z(n-L)]$^T$" and insert -- Z(n)=[z(n), z(n-1),..., z(n-L)]$^T$ --.

Column 9,
Line 4, delete "B=[0 0 0 0 $^1$]$^T$" and insert -- B=[0 0 0 0 1]$^T$ --

Column 10,
Line 20, delete "$e_{Benv}(n)=k_1{}^{SM}e_{DD}(n)+k_2 \cdot e_{God}(n)|e_{DD}(n)$" and insert
-- $e_{Benv}(n)=k_1 \cdot e_{DD}(n)+k_2 \cdot e_{God}(n)|e_{DD}(n)|$ --.
Line 25, delete "I-14)" and insert -- (I-14) --.

Column 13,
Line 9, delete "f=[0.8264, 001653, 008512, 001636, 081]" and insert -- f=[0.8264, 0.1653, 0.8512, 0.1636, 0.81] -- .

Column 14,
Line 27, delete "Z2(n)=[z2(n), z2(n-1),..., z2(n-L)T" and insert
-- Z2(n)=[z2(n), z2(n-1),..., z2(n-L)]$^T$ --.

UNITED STATES PATENT AND TRADEMARK OFFICE
CERTIFICATE OF CORRECTION

PATENT NO. : 5,909,466
DATED : June 1, 1999
INVENTOR(S) : Labat et al.

It is certified that error appears in the above-identified patent and that said Letters Patent is hereby corrected as shown below:

Column 15,
Line 22, delete "circuit is operable" and insert -- circuit is operably -- .
Line 36, delete "output (d(n)) of the decision circuit and its input w(n) or y(n)" and insert -- output $(\hat{d}(n))$ of the decision circuit and its input w(n) or y(n)) --.
Line 53, delete "data (d(n))" and insert -- data $(\hat{d}(n))$ -- .
Line 54, delete "corrected (exp(jθ))" and insert $(exp(j\hat{\theta}))$ -- .

Column 16,
Line 3, delete "data (d(n))" and insert -- data $(\hat{d}(n))$ -- .
Line 23, delete "comprising, an equalizer" and insert -- comprising an equalizer --.
Line 40, delete "claim 10" and insert -- claim 19 --.
Line 50, delete "comprising, an equalizer" and insert -- comprising an equalizer --.

Column 17,
Line 5, delete "comprising, an equalizer" and insert -- comprising an equalizer --.

Column 18,
Line 36, delete "output (d(n))" and insert -- output $(\hat{d}(n))$ -- .

Signed and Sealed this

Fourth Day of September, 2001

*Attest:*

*Attesting Officer*

NICHOLAS P. GODICI
*Acting Director of the United States Patent and Trademark Office*